United States Patent
Weaver et al.

(10) Patent No.: US 7,404,456 B2
(45) Date of Patent: Jul. 29, 2008

(54) APPARATUS AND METHOD OF IDENTIFYING ROCK PROPERTIES WHILE DRILLING

(75) Inventors: Gary Weaver, Conroe, TX (US); Roger L. Schultz, Aubrey, TX (US)

(73) Assignee: Halliburton Energy Services, Inc., Carrollton, TX (US)

( * ) Notice: Subject to any disclaimer, the term of this patent is extended or adjusted under 35 U.S.C. 154(b) by 285 days.

(21) Appl. No.: 10/960,395

(22) Filed: Oct. 7, 2004

(65) Prior Publication Data

US 2006/0076161 A1 Apr. 13, 2006

(51) Int. Cl.
*E21B 47/00* (2006.01)

(52) U.S. Cl. .............................. 175/50; 175/39; 175/40; 702/9

(58) Field of Classification Search .................. 175/50, 175/320; 702/9
See application file for complete search history.

(56) References Cited

U.S. PATENT DOCUMENTS

| | | | |
|---|---|---|---|
| 3,520,375 A | 7/1970 | Raynal et al. ................. 175/24 |
| 4,143,552 A | 3/1979 | Godfrey ....................... 73/579 |
| 5,144,589 A | 9/1992 | Hardage ....................... 367/25 |
| 5,248,857 A | 9/1993 | Ollivier ........................ 181/102 |
| 5,467,320 A | 11/1995 | Maki, Jr. ....................... 367/40 |
| 5,758,539 A | 6/1998 | Naville et al. ............... 73/152.03 |
| 5,774,418 A | 6/1998 | Magendie et al. ............. 367/25 |
| 5,798,488 A | 8/1998 | Beresford et al. ............ 181/102 |
| 5,877,996 A | 3/1999 | Krokstad et al. ............... 367/31 |
| 6,084,826 A | 7/2000 | Leggett, III ................... 367/82 |
| 6,216,533 B1 | 4/2001 | Woloson et al. ............ 73/152.47 |
| 6,480,118 B1 | 11/2002 | Rao ......................... 340/853.6 |
| 6,614,360 B1 | 9/2003 | Leggett, III et al. ...... 340/853.1 |
| 6,648,082 B2 | 11/2003 | Schultz et al. ................. 175/39 |
| 6,681,633 B2 | 1/2004 | Schultz et al. ................. 73/587 |
| 6,691,802 B2 | 2/2004 | Schultz et al. ................. 175/56 |
| 6,712,160 B1 | 3/2004 | Schultz et al. ................. 175/48 |
| 6,722,450 B2 | 4/2004 | Schultz et al. ................. 175/39 |
| 2001/0040379 A1 | 11/2001 | Schultz ......................... 290/1 |
| 2002/0124652 A1 | 9/2002 | Schultz et al. ................. 73/587 |
| 2002/0148646 A1 | 10/2002 | Schultz et al. ................. 175/40 |
| 2002/0148648 A1 | 10/2002 | Schultz et al. ................. 175/56 |
| 2003/0151975 A1 | 8/2003 | Zhou et al. ..................... 367/31 |
| 2003/0168257 A1 | 9/2003 | Aldred et al. .................. 175/24 |

FOREIGN PATENT DOCUMENTS

EP 0409304 A1 6/1990
GB 2273984 A 7/1994

OTHER PUBLICATIONS

UK Search Report, Application No. GB0519972.4, 3 pgs.
UK Examination Report, Application No. GB0519972.4, 3 pgs.

*Primary Examiner*—Jennifer H. Gay
*Assistant Examiner*—Brad Harcourt
(74) *Attorney, Agent, or Firm*—Baker Botts L.L.P.

(57) ABSTRACT

Acoustic signals generated by drilling a bore hole with a drill bit are received at sensors placed in the drill string. The acoustic signals received by the sensors are processed, e.g. using a Fourier transform, and a characteristic of the acoustic signals is used to identify lithology, rock strength, presence of oil, presence of gas, change in lithology, or the like.

19 Claims, 8 Drawing Sheets

APPARATUS AND METHOD OF IDENTIFYING ROCK PROPERTIES WHILE DRILLING

TECHNICAL FIELD

The present disclosure is related generally to identifying rock properties, and more particularly to identifying rock properties while drilling.

BACKGROUND

When conducting drilling operations, operators employ any number of methods and devices to ascertain information about downhole conditions. For example, information about a formation's lithology and the type of formation fluid can be determined using wireline logging or measurement-while-drilling (MWD) techniques. In developed reservoirs, similar information can be inferred from logs of offset wells, geological maps, and the like. Cuttings circulated to the surface may also be used to identify a formation's lithology, and changes in mud weight or resistivity (in water based muds) can be used to indicate the presence of hydrocarbons. Numerous other techniques and tools may also be used to gather information about downhole conditions.

Most of the methods mentioned above, however, do not provide real-time information during drilling operations. Wireline logging can be conducted only after the formation of interest has already been drilled through. Offset logs offer only general guidance, since there is no guarantee that the location, porosity, thickness, etc. of a formation of interest will be the same between offset wells and a well being drilled. Cuttings and changes in mud characteristics are known only after mud that is at the bit has had time to circulate to the surface. Some MWD tools require drilling to be suspended while a wireline or slickline is dropped through the drill string to retrieve data recorded by the downhole tool.

Acoustic-type MWD tools may provide information about formation properties in real-time. Acoustic-type tools generally measure various properties of acoustic signals (e.g. the time it takes an acoustic signal to travel from a transmitter, through the formation, and back to a receiver) to determine properties of the rock surrounding the wellbore. Such tools may be hindered by, for example, the acoustic signal being required to pass through multiple formation types having different acoustic properties, variations in mud density, noise generated by the drill string, or the like.

SUMMARY

It would be advantageous if a way could be found to determine downhole conditions in real-time, while drilling operations are being conducted.

Accordingly, an embodiment of the present disclosure provides a method that can be used to identify the type of rock being drilled through. The method identifies the type of rock being drilled through based on one or more characteristic of an acoustic signal generated by a drill bit being used to drill a wellbore.

The characteristic of the acoustics signal may be identified based on a frequency domain analysis of the acoustic signal. In at least one embodiment, for example, an acoustic signal generated by the drilling action of a bit is transmitted through the body of the bit to a sensor located in a downhole subassembly connected to the bit. A Fourier transform is performed on the received signal, and a characteristic of the signal, e.g. an amplitude pattern, is determined.

The characteristic determined for the signal may be used to identify the type of rock being drilled through. In one embodiment, for example, a bit characteristic is determined by rotating a selected type of drill bit in contact with a known type of rock. If this bit characteristic corresponds to a characteristic of the signal generated during drilling, the type of rock being drilled through can be identified.

In addition to identifying a rock type, various other rock properties, e.g. porosity, permeability, presence of a formation fluid, type of formation fluid, and the like can be determined using methods and apparatus according to various embodiments of the present disclosure.

Characteristics of an acoustic signal generated by drilling through a formation may also be used to identify changes in lithology, to optimize bit rate of penetration and bit life, and to monitor the condition of a cutting structure on the bit.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE DRAWINGS

Preferred embodiments and their advantages are best understood by reference to FIGS. 1 through 8, wherein like numbers are used to indicate like and corresponding parts.

Figure 1:
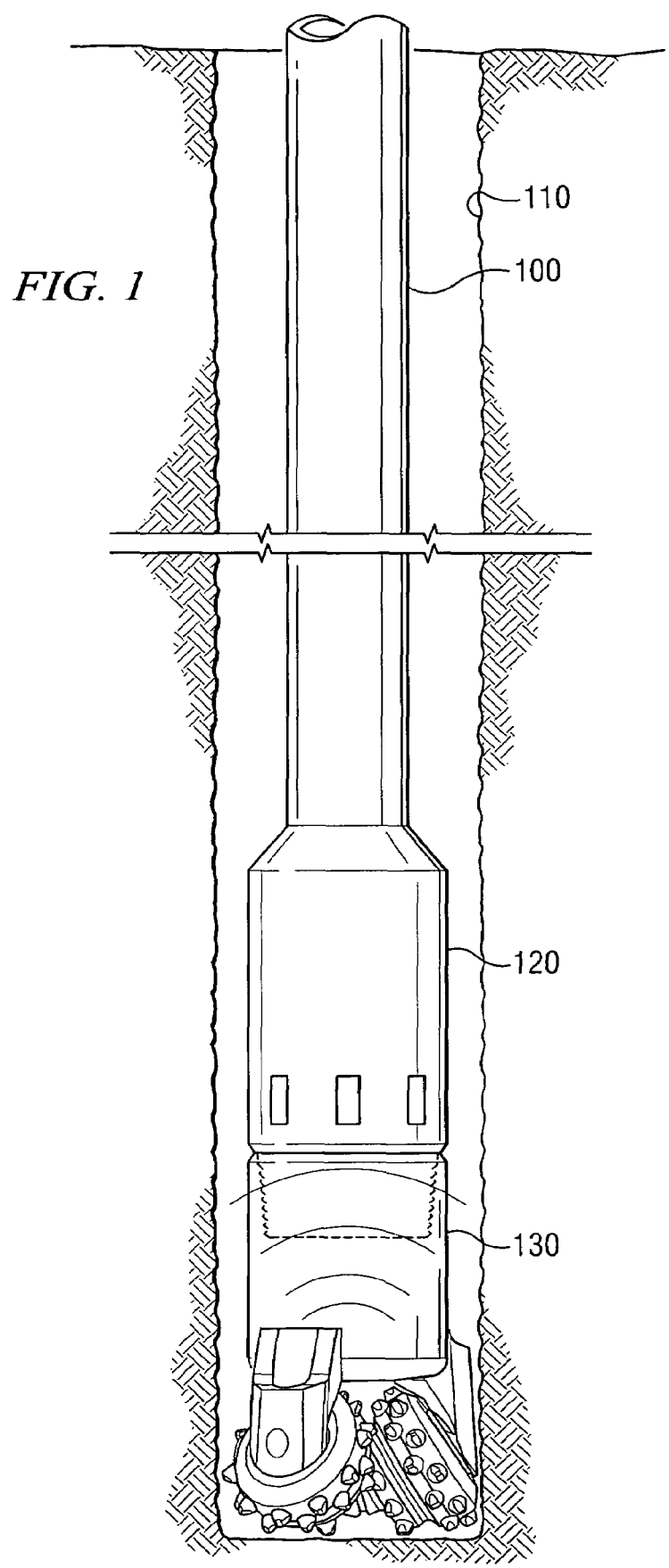
FIG. 1 is a diagram of a drill string employing roller cone bits according to an embodiment of the present disclosure.

FIG. 1 shows a schematic of the system including drill string 100 in borehole 110. In this embodiment, a sensor sub 120 containing accelerometers is position above a bit 130. The sensors could be placed above or below a mud motor or other BHA components as well. Acoustic signals generated by the bit 130 are picked up by the accelerometers. These acoustic signals can then be analyzed to describe the rock/formation properties being drilled. These include, but are not limited to, rock hardness, rock type, presence of oil, presence of gas, change in lithology, cutting structure condition, and rock strength. Conventional measurement while drilling (MWD) or acoustic telemetry technologies can be used to convey this information to the surface. This applies to any future telemetry while drilling system. It should be noted that the term "rock" as used herein, includes various geological materials that may be encountered during drilling operations, e.g., salt, clay, shale, sand and the like, in addition to those materials more formally classified as "rocks."

Figure 2:
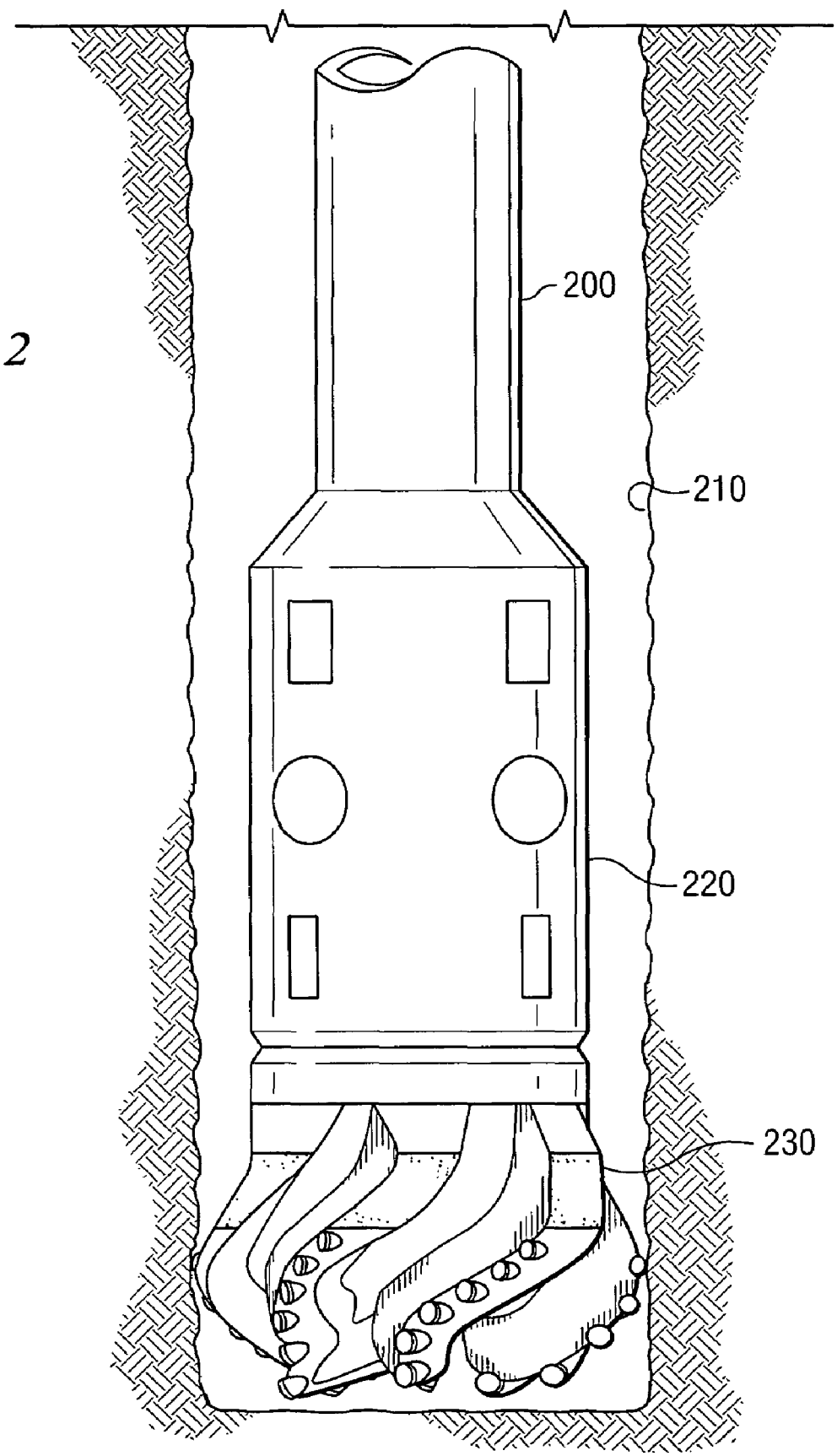
FIG. 2 is a diagram illustrating a fixed cutter bit threaded onto a downhole subassembly according to an embodiment of the present disclosure.

FIG. 2 shows a schematic of a drill string 200 positioned in wellbore 210. Drill string 200 includes a sensor sub 220 positioned above bit 230. Drill bit 230, in the illustrated embodiment, is a fixed bit cutter that generates acoustic signals as drill string 200 drills through rock to enlarge bore hole 210. Drill bit 230 is threadedly connected to sensor sub 220.

Acoustic energy generated as drill bit 230 drills through rock surrounding bore hole 210 are transmitted through the body of drill bit 230 and received by sensors positioned in sensor sub 220. Since drill bit 230 is relatively solid metal, acoustic energy traveling through the body of drill bit 230 will generally reach sensors located in sensor sub 220 faster than acoustic energy traveling either through the borehole or through the formation surrounding borehole 210. Additionally, the acoustic energy traveling through the body of drill bit 230 will generally be less attenuated than acoustic energy traveling outside of the bit.

The sensors in sensor sub 220 may include accelerometers, hydrophones, or any of various other suitable acoustic sensors known to those skilled in the art. As noted previously with respect to FIG. 1, sensors may be placed above or below a mud motor or other BHA in addition to, or in place of, sensors being placed directly above bit 230, as illustrated.

Figure 3:
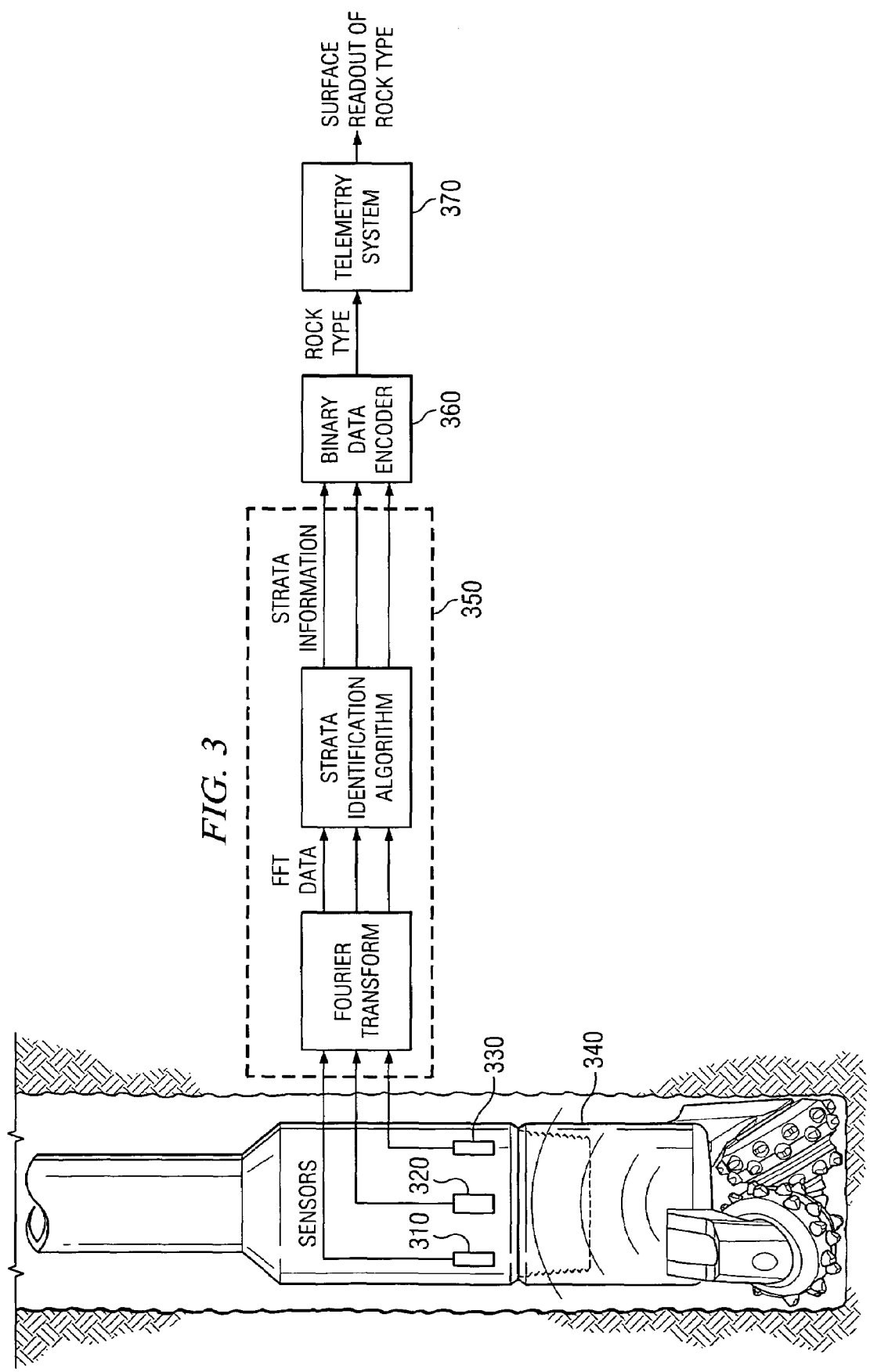
FIG. 3 is a diagram illustrating how information from sensors on a downhole sub may be processed according to an embodiment of the present disclosure.

Referring next to FIG. 3, processing of acoustic signals received at sensors 310, 320, and 330 will be discussed according to an embodiment of the present disclosure. Acoustic signals from drill bit 340 are received at sensors 310-330 and processed by processor 350. In at least one embodiment, processor 350 performs Fourier transform on the signals received at sensors 310-330 using of a Fast Fourier Transform (FFT) to generate FFT data. Processor 350 then applies a strata identification algorithm to the FFT data. A strata identification algorithm may, according to an embodiment of the present disclosure, include comparing the FFT data to previously stored data to determine common characteristics between the FFT data and the previously stored data.

For example, a particular type of drill bit may generate acoustic signals having identifiable frequency characteristics when used to drill through a particular type of rock. These characteristics may be identified in advance, and stored in a computer readable memory (not illustrated) in a processor 350. In one embodiment, the strata identification algorithm identifies commonalities between the FFT data and one or more previously stored bit characteristics. If the characteristics of the acoustic signals generated by drill bit 340 are consistent with the known characteristics against which they are compared, then the type of rock being drilled through can be identified based on common characteristics.

Figure 4:
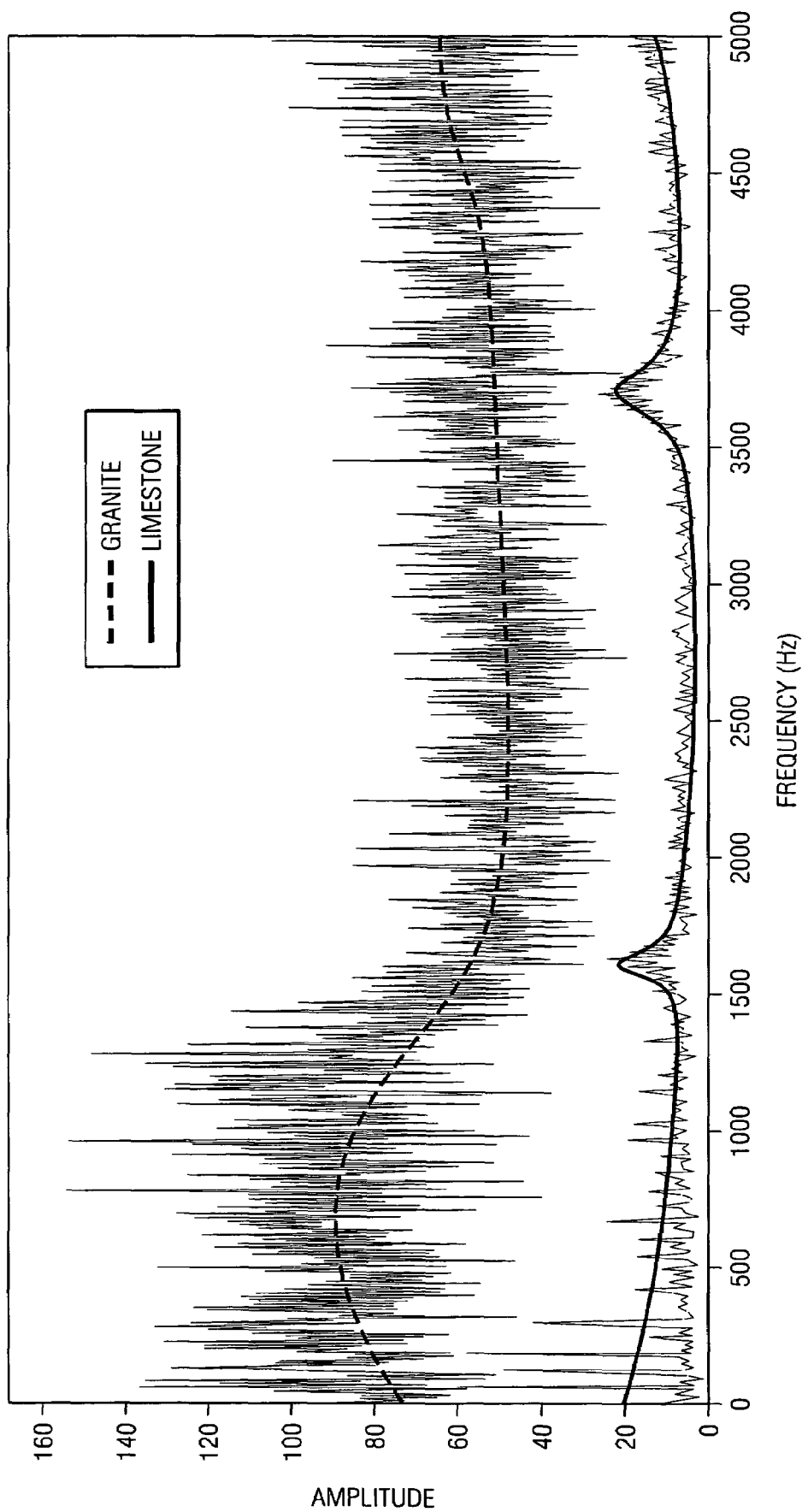
FIG. 4 is a frequency domain plot illustrating characteristics of a sharp drill bit used on two different types of rock, i.e., granite and limestone, according to an embodiment of the present disclosure.

Refer to FIG. 4 for an example. FIG. 4 illustrates an amplitude frequency plot generated as a result of performing a Fourier transform of acoustic signals generated by simulated drilling of granite and limestone using a particular type of drill bit. In this case, a portion of a fixed cutter drill bit was moved first across a sample of granite and then across a sample of limestone, while recording acoustic signals generated by this movement.

The drill bit used to obtain the data in FIG. 4 was a sharp drill bit. The acoustic signals generated by moving the portion of the sharp drill bit across granite generated an acoustic signal. A Fourier transform was performed on this signal to arrive at the amplitude frequency plot shown with the dashed line therethrough. The amplitude frequency plot with the solid line drawn through it is the frequency domain representation of acoustic signals generated when the sharp drill bit was moved across limestone rock.

One may note visually that the amplitude plot for limestone has peaks at frequencies of approximately 1700 Hz and 3700 Hz, while the amplitude plot of granite has a peak centered at approximately 700 Hz. One may also note the difference in rise and fall times of the peaks in granite and limestone, with the peaks in limestone being much sharper than the peaks in granite.

Applying this known frequency response to the example discussed in relation to FIG. 3, if drill bit 340 is drilling through limestone, then the FFT data generated from the acoustic signals received at sensors 310-330 can be expected to show frequency peaks at approximately 1700 Hz and 3700 Hz, as illustrated in FIG. 4. Likewise, if drilling through granite, a frequency peak would be expected at approximately 700 Hz.

It should be appreciated that characteristics of the FFT data other than the frequency at which amplitude peaks occur can be used in distinguishing granite and limestone. For example, the amplitude of the peaks may vary, as illustrated in FIG. 4. In the example illustrated in FIG. 4, the amplitude peaks for granite are higher than the amplitude peaks for limestone. Consequently, some embodiments of the present disclosure may compare both amplitude and location of frequency spikes to determine the type of rock being drilled through. Additionally, signal analysis techniques other than frequency domain analysis may be used consistent with the teachings of the present disclosure. Although limestone and granite are use for illustration, the teachings disclosed herein are equally applicable to other rock types.

Figure 5:
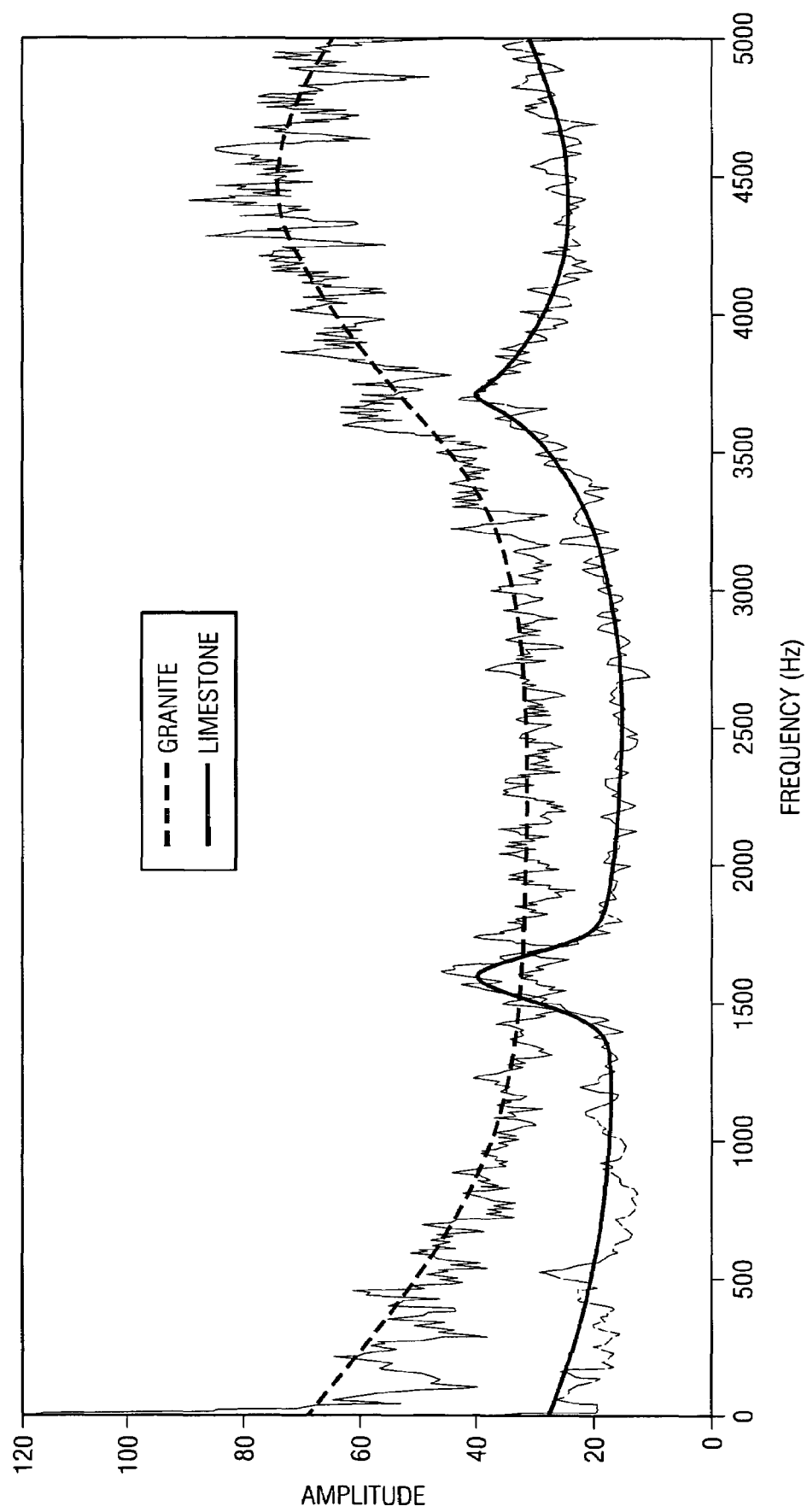
FIG. 5 is a frequency plot of a dull drill bit used on granite and limestone, illustrating a common drill bit characteristic for each rock type according to an embodiment of the present disclosure.

Referring next to FIG. 5, amplitude frequency plots of a dull drill bit being used to drill through granite and limestone are illustrated according to an embodiment of the present disclosure. Note that the frequency peaks of the drill bit drilling through limestone occur at approximately the same frequencies in the limestone regardless of whether the drill bit is dull (FIG. 5) or sharp (FIG. 4).

The frequency peaks in granite occur at different frequencies depending on whether the bit is dull or sharp. The peak amplitude obtained from the dull drill bit in granite, however, is similar to the peak amplitude obtained using the sharp drill bit in granite. Additionally, the general appearance of the granite curve in both FIGS. 4 and 5 illustrates a longer period between peaks than curves generated for limestone. Thus, the period between peaks may also be used in some embodiments to aid in identification of the rock-type being drilled through. Note that regardless of whether a sharp or dull bit is used, the distinction between signals generated by drilling through limestone and those generated by drilling through granite are apparent.

In other embodiments, the strata identification algorithm used by processor 350 need not necessarily be based on pre-characterized data, particularly if identifying a change in the type of rock being drilled through, rather than rock-type identification is desired. Identifying changes in rock strata may be useful, for example, in fields where the lithology of rock being drilled through is fairly constant, but it is deemed important to know when, for example, the drill bit has drilled through a shale cap and into sandstone.

In such a case, it may not be necessary to analyze and compare the FFT data generated downhole with stored data to identify characteristics of a particular rock type. Instead, it may be enough to know that there is a difference between an acoustic signal generated ten seconds ago and an acoustic signal being currently generated. This difference between two acoustic signals can, therefore, be used to identify changes in lithology, and allow the driller to adjust various parameters, such as weight on bit, mud weight, rotational speed of the drill string, or the like, to reduce formation damage when a production zone is contacted.

Figure 6:
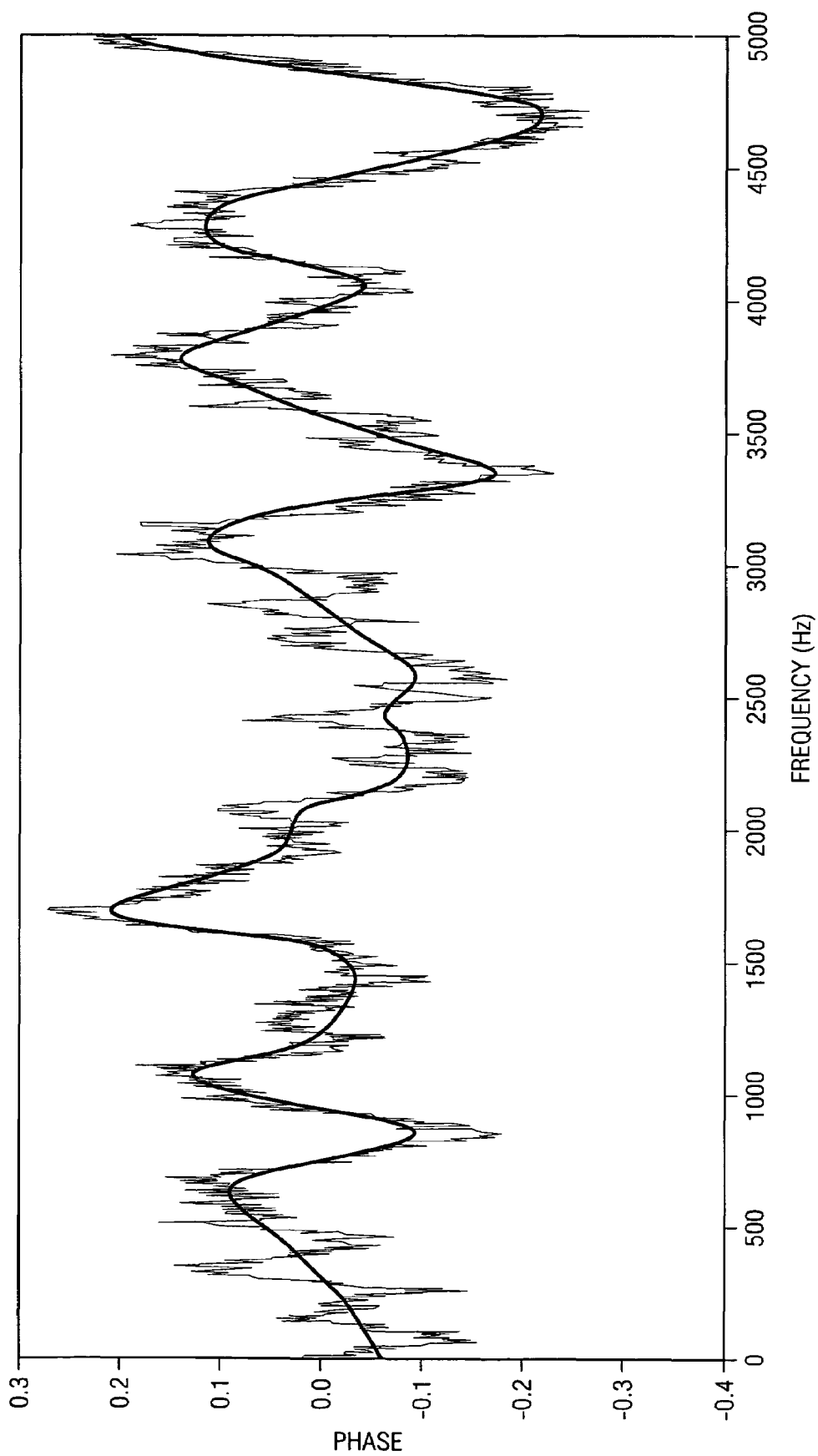
FIG. 6 illustrates a phase frequency plot of a sharp drill bit being used to drill limestone according to an embodiment of the present disclosure.
Figure 7:
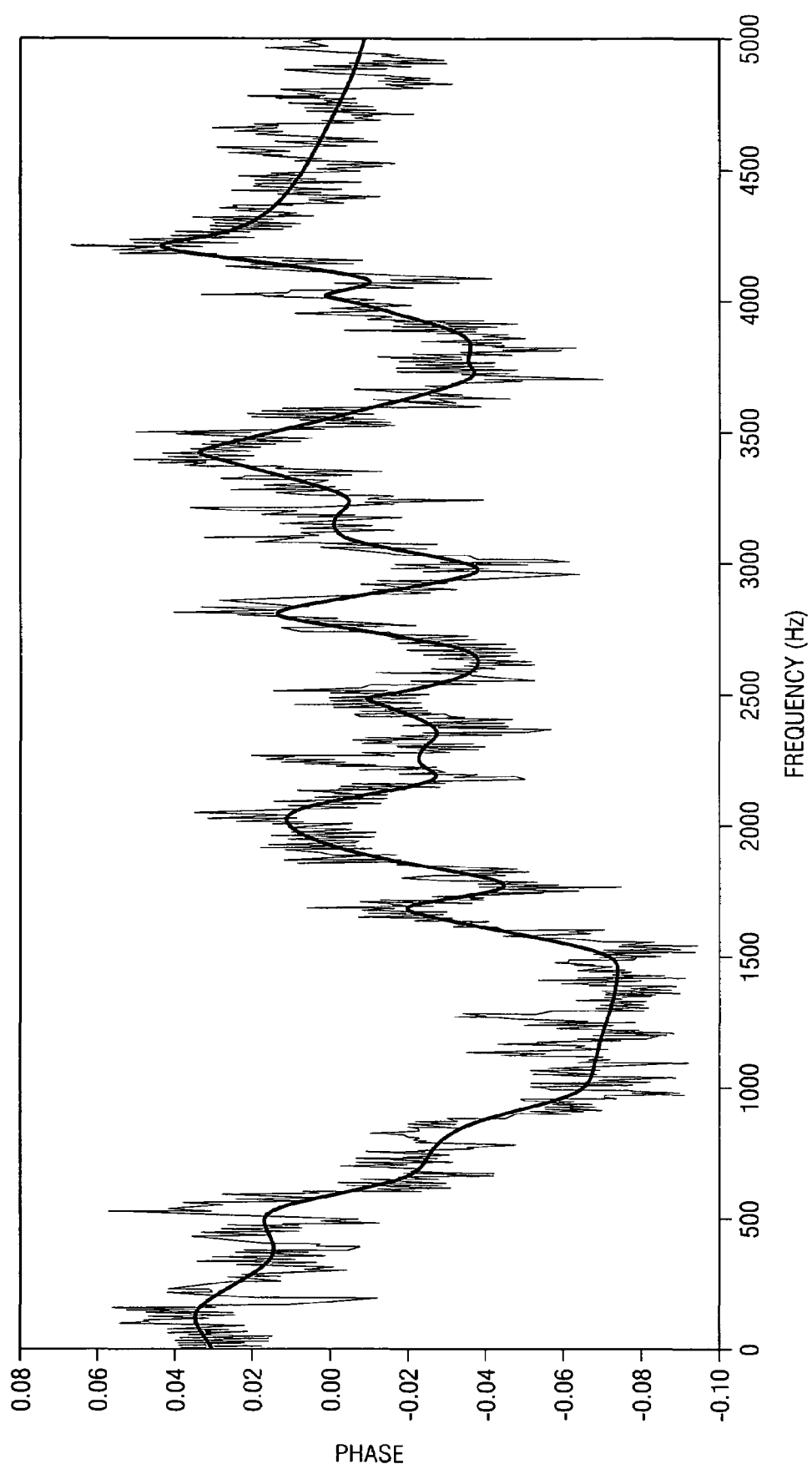
FIG. 7 is a phase frequency plot of a dull drill bit used to drill through limestone according to an embodiment of the present disclosure.

Referring next to FIGS. 6 and 7, phase/frequency plots of a drill bit in limestone are illustrated. FIG. 6 illustrates a sharp drill bit in limestone and FIG. 7 illustrates a dull drill bit in limestone. It may be noted that the phase/frequency plots of FIGS. 6 and 7 are not as closely correlated as the amplitude frequency plots shown in FIGS. 4 and 5. Nevertheless, various statistical analysis techniques known to those skilled in the art can be applied to these phase/frequency plots to help determine characteristics common to both phase/frequency responses illustrated in FIGS. 6 and 7. Furthermore, such phase/frequency plots may be useful in conjunction with amplitude frequency plots, or other information, to accurately identify a type of rock being drilled through.

The discussion up to this point has focused primarily on determining a rock type by using the frequency characteristics of acoustic signals generated by a drill bit drilling through a particular type of rock. Other embodiments of the present disclosure also use frequency characteristics of acoustic signals generated by the drill bit during drilling to determine other downhole parameters.

For example, the acoustic characteristics of a drill bit drilling through limestone filled with saltwater can be very different than the acoustic signals generated by a drill bit drilling through gas filled limestone. Examples of other characteristics that may be determined using the teachings set forth herein include, porosity of the rock, permeability of the rock, presence of fluid within the rock, and the type of fluid within the rock. Other rock properties may also be determined using the teachings set forth herein.

Referring again briefly to FIG. 3, in various embodiments, processor 350 reduces the volume of strata information to limit the amount of bandwidth needed to transmit the strata information up-hole, to the surface of the well. For example, if the strata information indicates that the drill bit is currently drilling through limestone, then a binary data encoder 360 may encode this information into, a few bits of data to be sent through the telemetry system 370.

Figure 8:
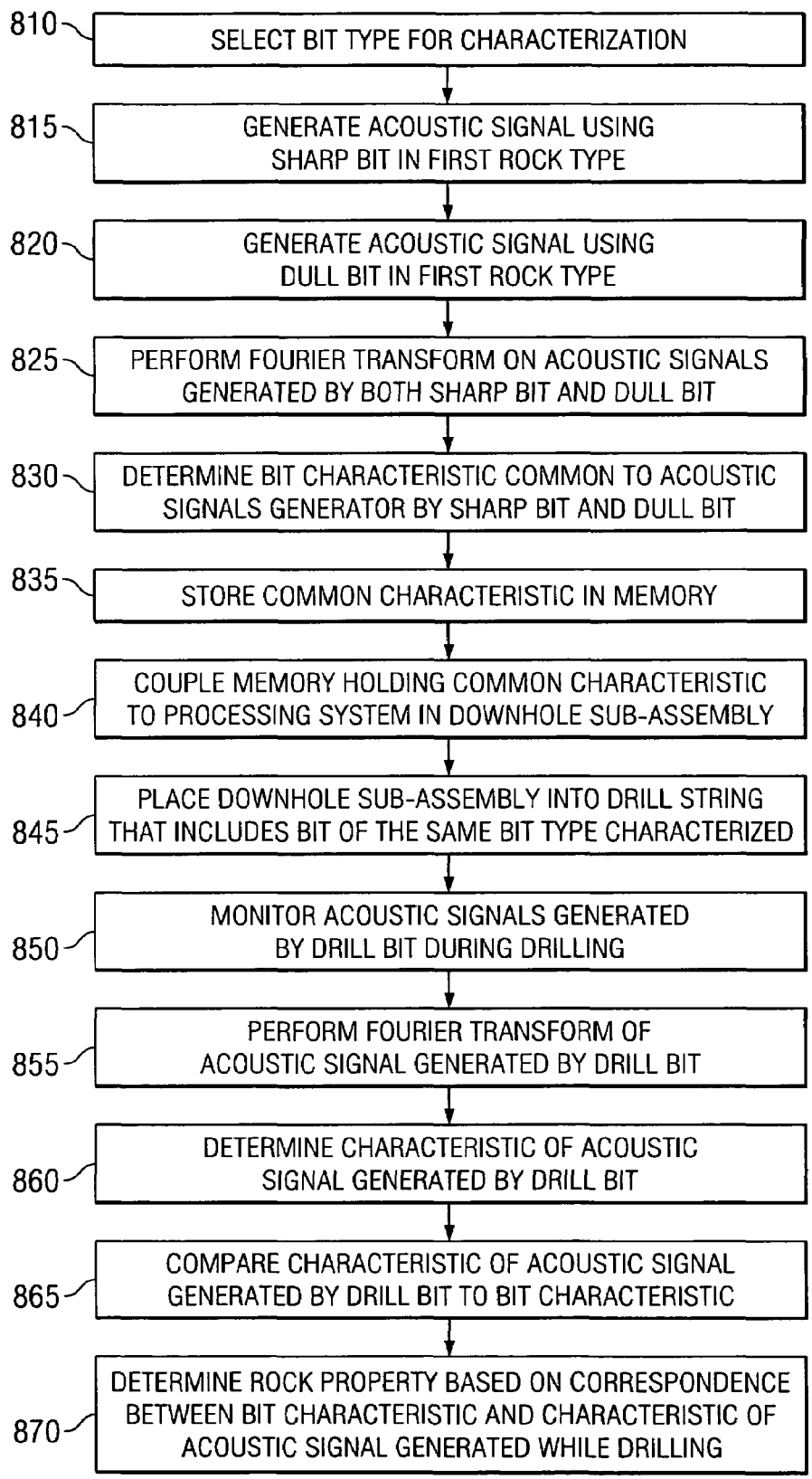
FIG. 8 is a flow diagram illustrating a method according to an embodiment of the present disclosure.

Referring now to FIG. 8, a method according to an embodiment of the present disclosure will be discussed. Method 800 begins at 810 where a bit type is selected for characterization. The bit type selected for characterization may include a roller cone bit, a fixed cutter bit, or any other type of bit that may be in industry use.

The method proceeds to 815, where acoustic signals generated using a sharp bit in a first type of rock are recorded. A dull bit of the same bit type is used to drill through the same type of rock at 820, and acoustic signals generated using the dull bit are recorded.

Having recorded acoustic signals generated by both dull and sharp bits in the same type of rock, the method proceeds to 825, where a Fourier transform is performed on these acoustic signals. Based on the information obtained from the Fourier transform, a bit characteristic common to acoustic signals generated by both sharp and dull bits can be determined in 830. An example of this can be seen by referring again briefly to FIGS. 4 and 5, in which a dull and sharp bit produce similar peaks while drilling through limestone and granite. These common characteristics can be stored in a memory for later use by a processor 350 (FIG. 3).

Referring again to FIG. 8, note that at this point, the method has determined that a particular type of drill bit will generally produce a characteristic acoustic signal, e.g. an acoustic signature, when drilling through a particular type of rock. The method, from 815-835, may be repeated as many times as desired, until the selected bit type has been characterized for as many different types of rock, or rock properties, as desired. Additionally, in at least one embodiment, multiple different types of drill bits are characterized across multiple different types of rock properties, with characteristics for multiple bit types being stored in a common memory.

In 840, the memory holding the common characteristic is coupled to a downhole processing system, for example in a downhole subassembly. If the memory includes information related to various multiple different bit types, then a single subassembly may be used with multiple different drill bit types. In other embodiments, for example where information for only a single drill bit type is stored in a memory, a downhole subassembly may be programmed for use with a desired type of bit. Alternatively, a separate subassembly, may be specifically configured for use with each different type of drill bit.

At 845, the downhole subassembly that contains the drill bit characteristics is placed into a drill string. As the wellbore is drilled, acoustic signals generated by the drill bit are monitored at 850. At 855, a Fourier transform of the monitored signals is performed. At 860 a characteristic of the acoustic signal generated by the drill bit while drilling the wellbore is identified.

At 865, the characteristic of the acoustic signal generated during drilling is compared to the previously determined bit characteristic. At 870 a correspondence between these two characteristics is used to determine the type of rock, contents of the rock, or other various properties associated with the rock being drilled through.

Note that various methods according to the present disclosure may implement more or fewer actions than illustrated in FIG. 8. For example, 810-835 of method 800 may be performed independent of 840-870. Additionally, some methods may omit 810-835 completely.

Although certain embodiments and their advantages have been described in detail, it should be understood that various changes, substitutions and alternations can be made herein without departing from the spirit and scope of the invention, as defined by the following claims.

What is claimed is:
1. A method comprising:
    drilling a wellbore into a first type of rock using a drill bit;
    sensing an acoustic energy generated by the drill bit drilling into the first type of rock;
    identifying a bit characteristic by rotating a selected type of drill bit in contact with a known type of rock and analyzing acoustic energy generated thereby; and
    identifying the first type of rock as being the same type of rock as the known type of rock based on a correspondence between the acoustic energy generated by the drill bit and the bit characteristic.
2. The method of claim 1, further comprising determining a characteristic of the acoustic energy based on a frequency domain amplitude analysis.
3. The method of claim 1, further comprising determining a change in rock type based, at least in part, on a characteristic of the acoustic energy.
4. The method of claim 1, further comprising:
    identifying a characteristic common to both acoustic energy generated by a sharp drill bit of the selected type and acoustic energy generated by a dull drill bit of the selected type.

5. The method of claim 1, wherein sensing the acoustic energy comprises receiving, at a sensor mounted to a downhole assembly, acoustic energy transmitted through a body of the drill bit.

6. The method of claim 5, wherein receiving the acoustic energy at the sensor comprises receiving the energy with an accelerometer.

7. The method of claim 1, wherein sensing the acoustic energy comprises receiving acoustic energy using a hydrophone.

8. The method of claim 1, further comprising:
sensing the acoustic energy downhole; and
transmitting information associated with the acoustic energy uphole.

9. The method of claim 8, further comprising:
processing the acoustic energy downhole to generate a processed signal; and
transmitting the processed signal to an associated well surface.

10. An apparatus comprising:
a sensor operable to receive acoustic energy generated by a drill bit drilling into rock;
a processing system configured to analyze the acoustic energy and determine a property associated with the rock based, at least in part, on a characteristic of the acoustic energy;
the processing system operable to perform a Fourier transform of the acoustic energy using a computer readable medium embodying a program of executable instructions and combinatorial logic;
the processing system operable to determine a property associated with the rock based on a frequency domain amplitude analysis;
the processing system operable to determine a property associated with the rock based on a characteristic common to both acoustic energy generated by a sharp drill bit of the selected type and acoustic energy generated by a dull drill bit of the selected type.

11. The apparatus of claim 10, further comprising a performing means selected from a group consisting of a computer readable medium embodying a program of executable instructions, and combinatorial logic.

12. The apparatus of claim 10, wherein the property associated with the rock is selected from a group consisting of a lithology of the rock, a porosity of the rock, a permeability of the rock, presence of a fluid within the rock, and a type of fluid within the rock.

13. The apparatus of claim 10, wherein the sensor comprises an accelerometer configured to receive acoustic energy transmitted through a body of the drill bit.

14. The apparatus of claim 10, wherein the apparatus comprises a downhole sub-assembly.

15. The apparatus of claim 10, wherein the sensor comprises a hydrophone.

16. The apparatus of claim 10, further comprising a telemetry system to transmit information associated with the acoustic energy to an associated wellsurface.

17. The apparatus of claim 16, further comprising an encoder to generate a processed signal.

18. The apparatus of claim 10, further comprising:
a data encoder; and
a telemetry system.

19. The apparatus of claim 10, further comprising the sensor configured to receive acoustic energy traveling through the drill bit.

* * * * *